United States Patent
Kekre et al.

(10) Patent No.: US 9,606,881 B1
(45) Date of Patent: *Mar. 28, 2017

(54) METHOD AND SYSTEM FOR RAPID FAILBACK OF A COMPUTER SYSTEM IN A DISASTER RECOVERY ENVIRONMENT

(71) Applicant: Symantec Operating Corporation, Mountain View, CA (US)

(72) Inventors: Anand Kekre, Pune (IN); Angshuman Bezbaruah, Pune (IN); Ankur Panchbudhe, Pune (IN)

(73) Assignee: Veritas Technologies LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/048,517

(22) Filed: Oct. 8, 2013

Related U.S. Application Data

(63) Continuation of application No. 13/245,080, filed on Sep. 26, 2011, now Pat. No. 8,560,886, which is a continuation of application No. 11/413,889, filed on Apr. 28, 2006, now Pat. No. 8,028,192.

(51) Int. Cl.
*G06F 11/20* (2006.01)
(52) U.S. Cl.
CPC .................. *G06F 11/203* (2013.01)

(58) Field of Classification Search
CPC ............ G06F 11/2069; G06F 11/2071; G06F 11/2023; G06F 11/2082
USPC .......................................................... 714/13
See application file for complete search history.

(56) References Cited

U.S. PATENT DOCUMENTS

| | | | |
|---|---|---|---|
| 2004/0268177 A1* | 12/2004 | Ji et al. ............................ | 714/6 |
| 2005/0154937 A1* | 7/2005 | Achiwa .............................. | 714/6 |
| 2006/0095478 A1* | 5/2006 | Cherkauer .......... | G06F 11/1662 |
| 2007/0050575 A1* | 3/2007 | Uratani et al. ................ | 711/162 |

* cited by examiner

*Primary Examiner* — Jigar Patel
(74) *Attorney, Agent, or Firm* — Campbell Stephenson LLP

(57) ABSTRACT

A method, system and computer-readable medium for providing rapid failback of a computer system is described. The method, which operates during failback of a secondary computer to a primary computer, accesses a map to determine a location of a latest version of data corresponding to a read request, where the location may be within either a primary data storage or a secondary data storage. The system comprises a primary computer coupled to a primary data storage and a secondary computer coupled to a secondary data storage. The primary computer maintains a write log and the secondary computer maintains a map. The computer-readable medium contains instructions, which, when executed by a processor, performs the steps embodied by the method.

20 Claims, 5 Drawing Sheets

METHOD AND SYSTEM FOR RAPID FAILBACK OF A COMPUTER SYSTEM IN A DISASTER RECOVERY ENVIRONMENT

CROSS-REFERENCE TO RELATED APPLICATIONS

This application is a continuation of U.S. patent application Ser. No. 13/245,080 filed on Sep. 26, 2011, which is a continuation of U.S. patent application Ser. No. 11/413,889, entitled "Method and System for Rapid Failback of a Computer System in a Disaster Recovery Environment", filed Apr. 28, 2006, (now U.S. Pat. No. 8,028,192), and naming Anand A. Kekre, Ankur Panchbudhe, and Angshuman Bezbaruah as inventors. This application is assigned to Symantec Operating Corporation, the assignee of the present invention, and is hereby incorporated by reference, in its entirety and for all purposes.

BACKGROUND OF THE INVENTION

Field of the Invention

Embodiments of the present invention generally relate to disaster recovery of a computer system and, more particularly, to a method and system for rapid failback of a computer system in a disaster recovery environment.

Description of Related Art

Computer systems having disaster recovery capabilities are desirable for many workplace environments. Such systems are intended to rapidly transfer computing functions from a failed computer (primary computer) to a secondary computer with minimal impact on a user. Once the failed computer returns to operation, the disaster recovery is completed by returning the computing functions to the primary computer.

Businesses and organizations depend upon the data stored on these systems and expect that, after a disaster, the recovery process will be quick. In the event of a computer virus, data corruption, system failure, power outage, or any natural disaster, without a system for disaster recovery, data may be lost or become inaccessible for a period of time while the disaster recovery process is occurring. Therefore, to protect system data and facilitate rapid disaster recovery, the data is replicated from one computer system to a remote computer system. The replicated data is available to a user upon failover of the primary computer to the secondary computer. A disaster recovery operation has two components: failover, where the secondary computer operates as the primary computer when the primary computer fails, and failback, where the computing function assumed by the secondary computer is returned to the primary computer upon the primary computer becoming functional.

More specifically, to prepare for a failover, data is backed up (replicated) from a primary computer to a secondary computer. The secondary computer is typically remote to the primary computer and stores a duplicate image of a primary data storage as a secondary data storage. The secondary data storage is used for disaster recovery, i.e., restoring the primary data storage in the event of a failure of the primary computer. Upon failover, the secondary computer assumes the role of the primary computer and writes data to the secondary data storage.

Recovery and restoration of data should occur as quickly and seamlessly as possible. The restored primary computer needs to resume the computing functions of application software as rapidly as possible. During a conventional failback operation, applications cannot be restarted on the primary computer until the secondary data storage is synchronized with the primary data storage, i.e., all of the data written to the secondary data storage after failover is copied to the primary data storage. The recovery operation may take a prolonged period of time, depending on the amount of data that needs to be copied from the secondary data storage to the primary data storage.

Businesses require failover and failback operations to occur as rapidly and as seamlessly as possible. More importantly, prompt access to all of the data, i.e. data written by the primary computer prior to failover and data written by the secondary computer after failover, is desirable. Conventional failback does not allow access to all of the data until synchronization between the primary data storage and the secondary data storage is complete.

Thus, there is a need in the art for a method and system of rapidly performing a failback operation of a computer system in a manner that provides access to all of the data prior to the completion of the synchronization operation.

SUMMARY OF THE INVENTION

A method, system and computer-readable medium for providing rapid failback of a computer system is described. The method provides access to data storage during failback of applications from a secondary computer to a primary computer. The method comprises, during a failback procedure, where a primary data storage of the primary computer is being synchronized with a secondary data storage of the secondary computer, receiving a read request from an application, accessing a map to determine a location of a latest version of data corresponding to the read request, where the location may be within either the primary data storage or the secondary data storage, and reading data from the location. The system comprises a primary computer coupled to a primary data storage and a secondary computer coupled to a secondary data. The primary computer maintains a write log and the secondary computer maintains a map. The computer-readable medium contains instructions, which, when executed by a processor, performs the steps embodied by the method.

BRIEF DESCRIPTION OF THE DRAWINGS

Various embodiments of the invention will hereinafter be described in conjunction with the appended drawings, provided to illustrate and not to limit the invention, wherein like designations denote like elements, and in which.

DETAILED DESCRIPTION

Figure 1:
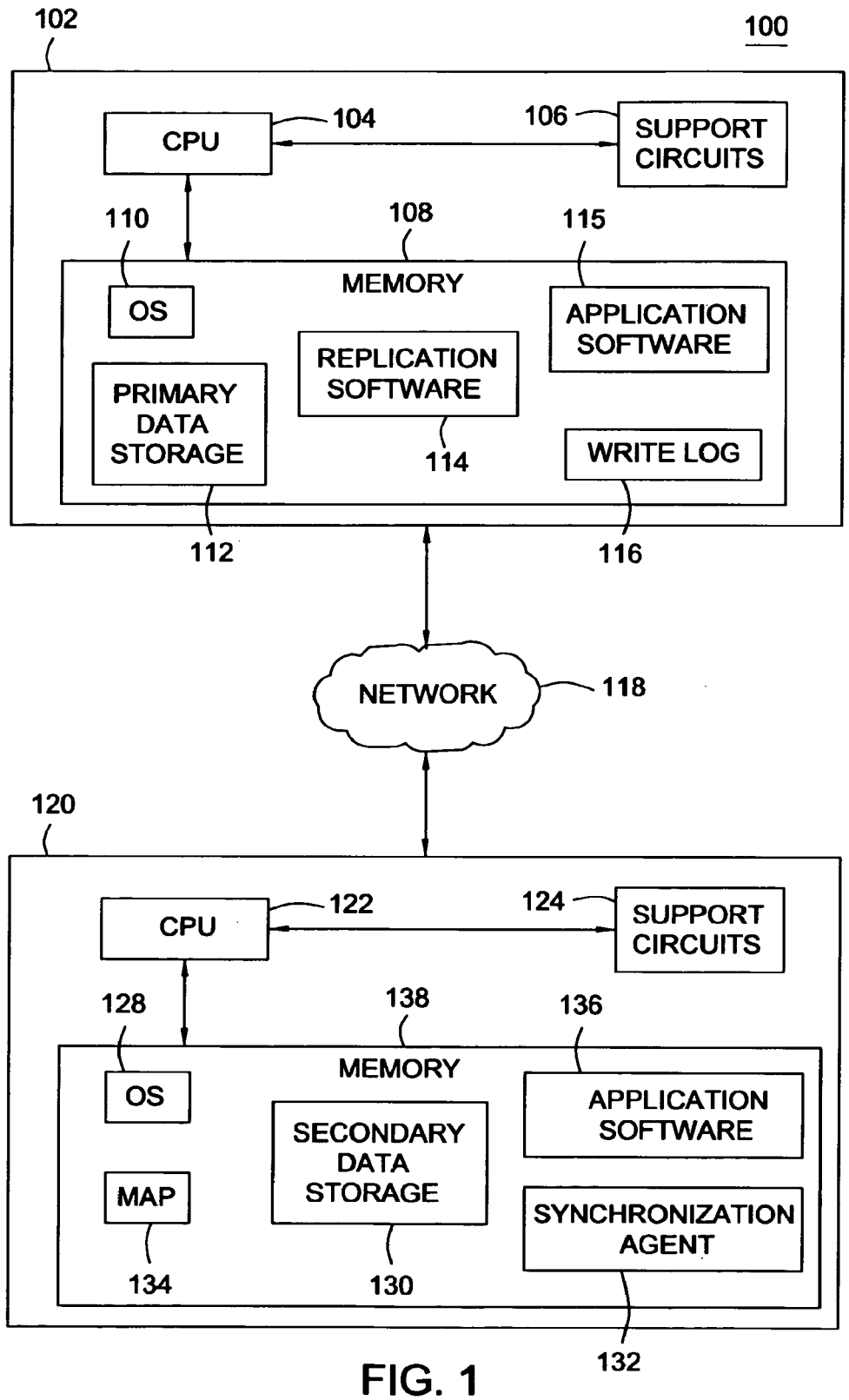
FIG. 1 is a block diagram of a high-availability computer environment in which the present invention can be utilized.

FIG. 1 depicts a computing environment 100 in which one embodiment of the present invention may be utilized to provide rapid disaster recovery. The computing environment 100 includes a primary computer 102 connected to a secondary computer 120 via a communications network 118. The computers 102 and 120 may be desktop computers, laptop computers, servers, virtualization switches such as those manufactured by BROCADE and CISCO SYSTEMS, intelligent RAID subsystems such as those manufactured by HITACHI and EMC or any computing device which can benefit from a connection to the communications network 118. The communications network 118 may be any conventional network, such as an Ethernet network, a fiber channel network or a wide area network (WAN) that provides either a direct or indirect (e.g., Internet or communication via a client) connection between the computers.

The primary computer 102 comprises at least one central processing unit (CPU) 104, support circuits 106, and memory 108. The CPU 104 may comprise one or more conventionally available microprocessors. The support circuits 106 are well known circuits that comprise power supplies, clocks, input/output interface circuitry and the like.

Memory 108 may comprise random access memory, read only memory, removable disk memory, flash memory, and various combinations of these types of memory. The memory 108 is sometimes referred to as main memory and may in part be used as cache memory or buffer memory. The memory 108 stores various software packages, such as an operating system (OS) 110, a primary data storage 112, replication software 114, application software 115 and a write log 116. The primary data storage 112 may be internal to the primary computer 102 or external to the primary computer 102, e.g. on a storage area network (SAN).

The primary computer 102 may function as an application server. The primary computer 102 executes application software 115 such as Internet, productivity software, collaboration software, databases, electronic mail and the like. The data stored by the application software 115 is, under normal operation, written to the primary data storage 112.

The write log 116 maintains a record of the write requests made by the application software 115. More specifically, the write log maintains a record of the physical addresses or logical addresses of the data written by the application software 115 to the primary data storage 112. The write log 116 is cleared after the secondary computer 120 acknowledges that the write request was completed in the secondary storage, as discussed below.

The replication software 114 provides for an asynchronous replication of data stored in the primary data storage 112 to the secondary computer 120. An exemplary replication software 114 is VERITAS VOLUME REPLICATOR available from Veritas Corporation of Mountain View, Calif.

An asynchronous replication operation records each write request made by the application software 115 to the write log 116. The write requests are then sent to the secondary computer 120. The primary computer receives an acknowledgment (ack) from the secondary computer 120 that the write request has been completed on the secondary data storage 130. As such, writes are returned to the issuing application software 115, without waiting for an acknowledgement to be received from the secondary computer 120. The write request is also recorded locally to the primary data storage 112. The primary computer 102 continues execution of the application software 115 while writing data to the primary data storage 112 and supplying the data to the secondary computer 120. The secondary computer 120 acknowledges completion of the write from the primary computer 102. After the acknowledgment is received, the primary computer 102 clears the write log 116. The operation is considered asynchronous because the primary computer 102 does not need to receive an acknowledgment from the secondary computer 120 that the data was successfully received before continuing execution of the application software 115.

The secondary computer 120 comprises at least one central processing unit (CPU) 122, support circuits 124, and memory 126. The CPU 122 may comprise one or more conventionally available microprocessors. The support circuits 124 are well known circuits that comprise power supplies, clocks, input/output interface circuitry and the like.

Memory 126 may comprise random access memory, read only memory, removable disk memory, flash memory, and various combinations of these types of memory. The memory 126 is sometimes referred to as main memory and may in part be used as cache memory or buffer memory. The memory 126 stores various software packages, such as an operating system (OS) 128, the secondary data storage 130, a synchronization agent 132, a map 134, and application software 136. The secondary data storage 130 may be internal to the secondary computer 120 or external to the secondary computer 120, e.g. on a storage area network (SAN).

The secondary computer 120 functions as a backup application server. The secondary computer 120 assumes the role of the primary computer 102 in the event the primary computer 102 fails. The secondary computer 120 executes application software 136 such as Internet, productivity software, collaboration software, databases, electronic mail and the like. The application software 136 is often the same software available on the primary computer 102, ensuring a user has continuous access to these applications.

The secondary data storage 130 is a replica of the primary data storage 112. The replication software 114 copies data stored in the primary data storage 112 to the secondary data storage 130 in an asynchronous manner, i.e. the replication software 114 does not copy the data written to the primary data storage 112 simultaneously to the backup data storage 130. The operation of an asynchronous backup operation is discussed in further detail above. Immediately following the completion of a replication operation, the primary data storage 112 and the secondary data storage 130 are identical. Since the replication operation is performed asynchronously, the secondary data storage 130 is not always identical to the primary data storage 112. Over time, the primary data storage 112 will differ from the secondary data storage 130 until a replication operation is completed.

During a failover, the secondary computer 120 assumes the role of the primary computer 102. Since the secondary computer 120 usually executes the same application software 136 as the application software 115 executed by the primary computer 102, the interruption experienced by a user is minimized. The application software 136 writes data to the secondary data storage 130 after a failover to the secondary computer 120. After the application resumes in the secondary computer 120, the map 134 records modifications, i.e. writes of data, made by the application software 136 to the secondary data storage 130. More specifically, the map 134 records a write address, i.e. a physical or logical address, for the data written to the secondary date storage 130. The map 134 may be an extent map, a data log, a bitmap (one bit per block) and the like.

The synchronization agent 132 facilitates coordination of the primary computer 102 with the secondary computer 120 during failback of the application to the primary computer 102. The synchronization agent 132 updates the map 134 with the write requests, i.e. the physical addresses or the logical addresses, recorded in the write log 116 of the primary server 102. The updated map 134 is now the union of the write addresses recorded in the write log 116 and all of the write requests made to the secondary data storage 130 by the application software 136. The updated map 134 provides complete read address information for data stored after the completion of the last replication operation.

The application software 115 on the primary computer 102 accesses the map 134 on the secondary computer 120 during a failback operation. The map 134 is sent to the primary computer 102, so that the map can be inspected locally in the primary computer 102, while serving read requests from the application software 115. The map 134 provides the application software 115 with a proper read address for the data written after the last replication operation of the primary computer 102. In one embodiment of the invention, if the map 134 contains a read address for the data requested by the application software 115, then the data is retrieved from the secondary data storage 130. If the map 134 does not contain a read address for the data requested by the application software 115, then the data is retrieved from the primary data storage 112. In another embodiment of the invention, the map 134 is a bitmap having one bit per block, e.g., a "1" indicates the associated data block is within the secondary data storage 130 and a "0" indicates the associated data block is within the primary data storage 112.

Figure 2:
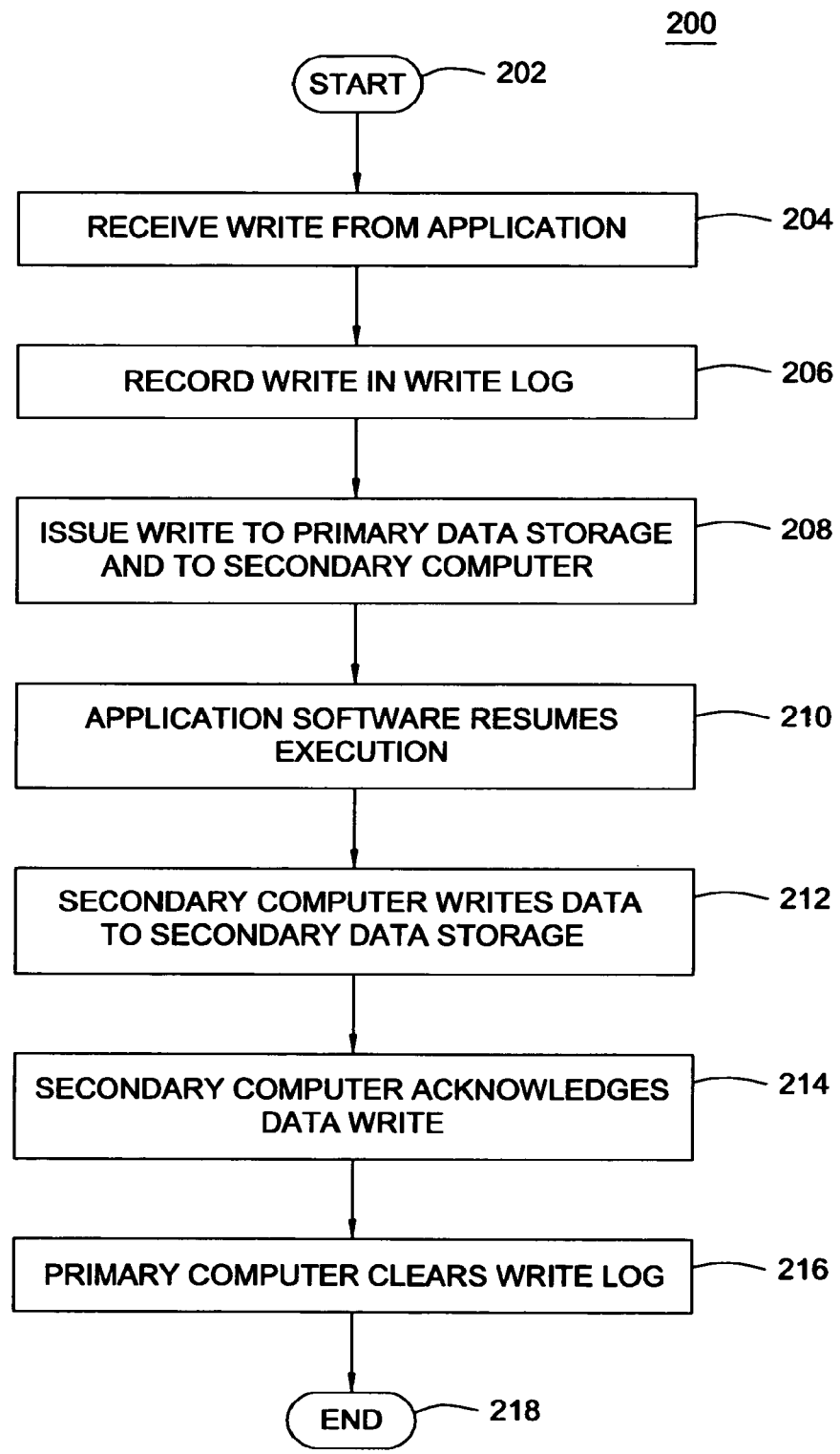
FIG. 2 is a flow diagram of a method for replicating a high-availability computer system in accordance with one embodiment of the present invention.

FIG. 2 is a flow diagram of a method 200 for replicating a primary data storage 112 to a secondary data storage 130. The method 200 begins at step 202 and proceeds to step 204. At step 204, the primary data storage 112 receives a write request from application software 115. At step 206, the write request is stored in a write log 116. At step 208, the write request is simultaneously issued to the primary data storage 112 and also to a secondary computer 120, i.e., the computer coupled to the secondary data storage 130.

At step 210, the application software 115 resumes execution. At step 212, the secondary computer 120 writes the data received at step 208 to the secondary data storage 130. At step 214, the secondary computer 120 acknowledges the data write to a primary computer 102, i.e., the computer coupled to the primary data storage 112. At step 216, the primary computer 102 clears the write log 116. The method 200 ends at step 218.

Figure 3:
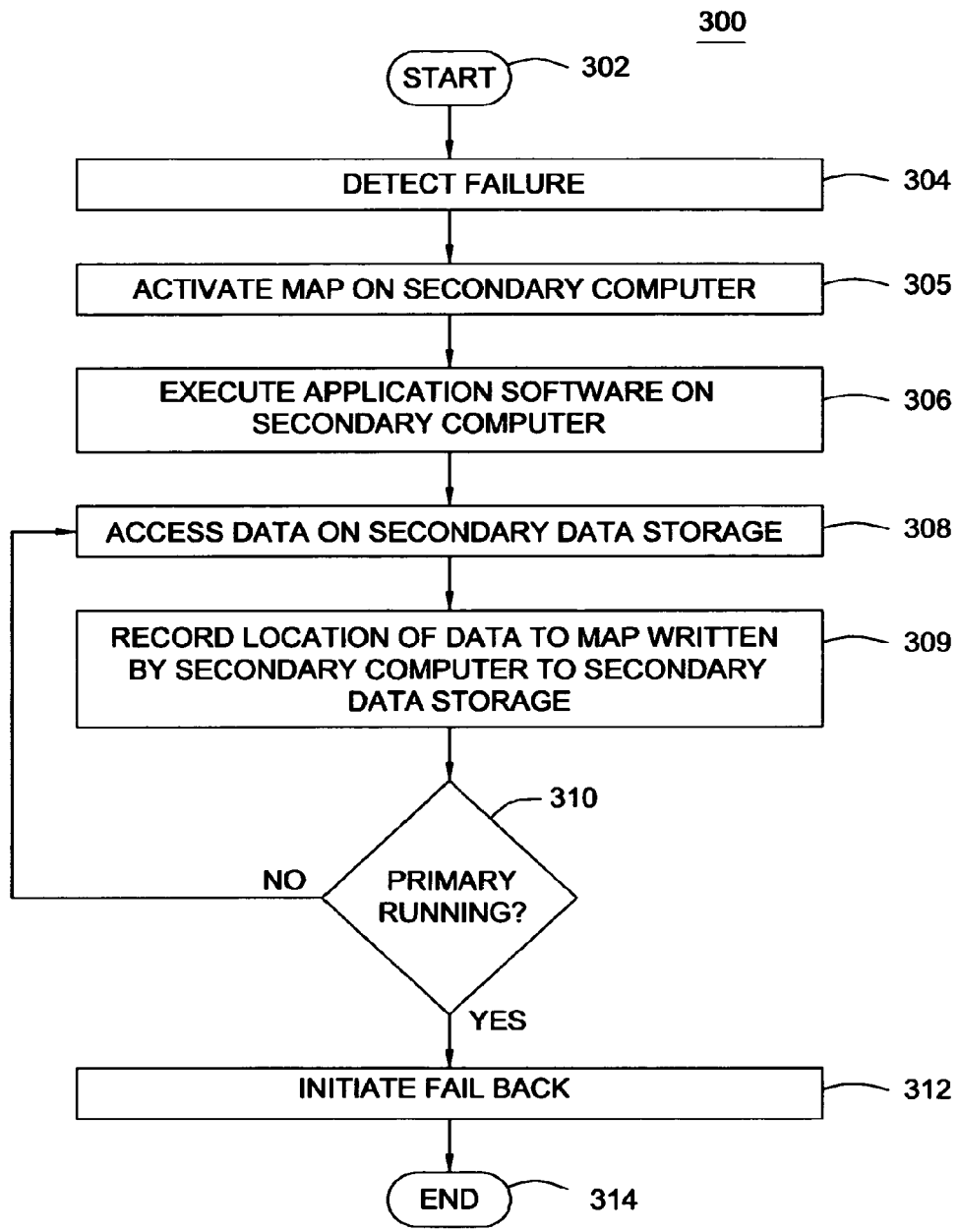
FIG. 3 is a flow diagram of a method for failing over a high-availability computer system in accordance with one embodiment of the present invention.

FIG. 3 is a flow diagram of a method 300 for failover of a high-availability computer system in accordance with one embodiment of the present invention. The method 300 starts at step 302 and proceeds to step 304. At step 304, a failure in a primary computer 102 is detected. At step 305, a map 134 is activated on a secondary computer 120. At step 306, application software 136 on the secondary computer 120 is executed. The application software 136 on the secondary computer 120 is generally identical to application software 115 executed by the primary computer 102. Since the mode of replication is asynchronous, the secondary data storage 130 might lag the primary data storage 112 by a few writes. Therefore the failed over application 136 starts on the secondary computer 120 with one of its previous states.

At step 308, the application software 136 accesses data on a secondary data storage 130. Since the secondary data storage 130 is a substantially identical replica of the primary data storage 112, most of the data required by the application software 136 will be located on the secondary data storage 130. The only data not replicated from the primary data storage 112 to the secondary data storage 130 will be the data identified in a write log 116. The data identified in the write log 116 is data written by the application software 115 to the primary data storage 112 that has not been copied from the primary data storage 112 to the secondary data storage 130. At step 309, the secondary computer 120 records the location of data stored on the secondary data storage 130 after failover to the map 134.

At decision step 310, the method 300 checks to determine if the primary computer 102 is restored and running. If the answer is no, then the method 300 loops to step 308 and the application software 136 continues to access the secondary data storage 130. Thus, the secondary computer 120 continues in the role of the failed primary computer 102. If the answer is yes, then the method proceeds to step 312. At step 312, an appropriate failback process (FIG. 4) is initiated. The method 300 ends at step 314.

Figure 4:
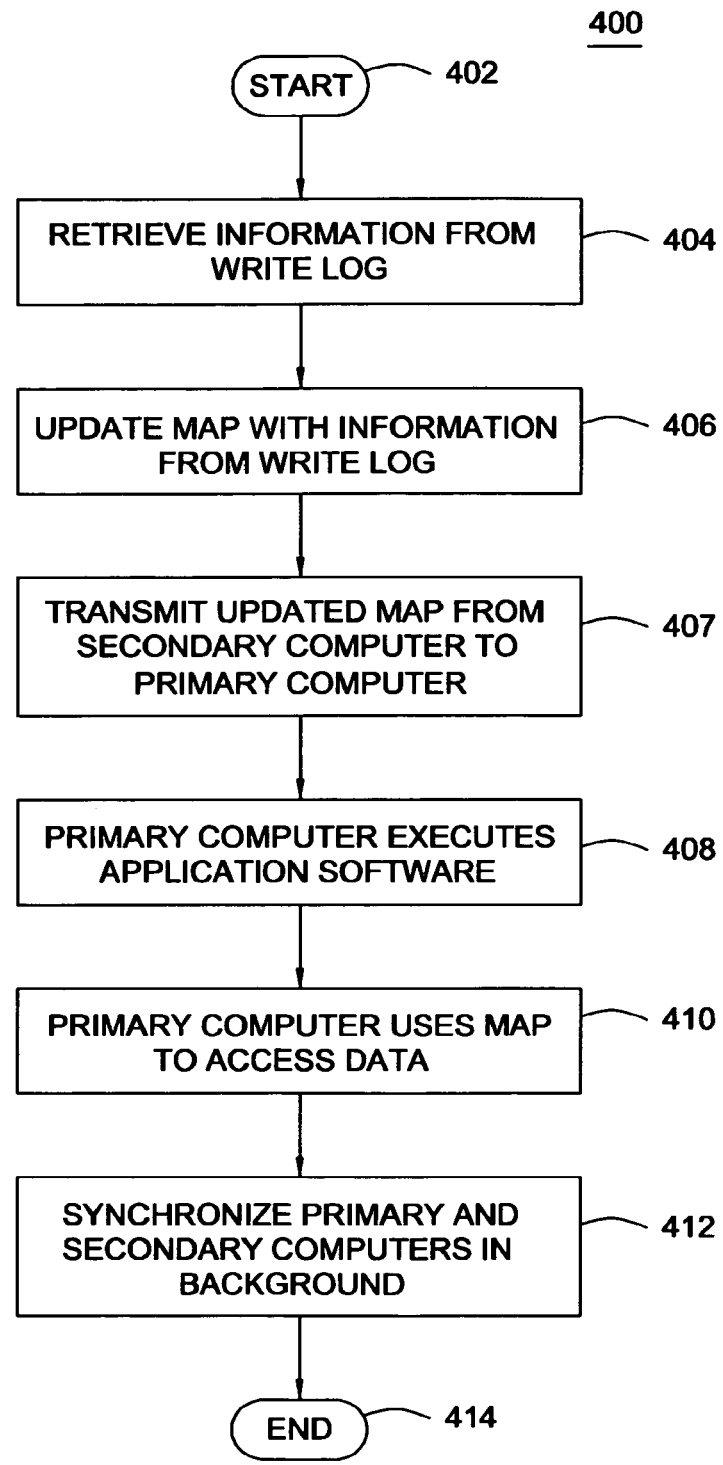
FIG. 4 is a flow diagram of a method for failing back a high-availability computer system in accordance with one embodiment of the present invention.

FIG. 4 is a flow diagram of a method 400 for failback of a computer system in accordance with one embodiment of the present invention. The method 400 begins at step 402 and proceeds to step 404. At step 404, a secondary computer 120 retrieves the information stored in a write log 116 of a primary computer 102. At step 406, the secondary computer 120 synchronizes a map 134 with information from the write log 116. Synchronization is performed by the union of write addresses stored in the map 134 with the write addresses stored in the write log 116. At step 407, the updated map 134 is transmitted from the secondary computer 120 to the primary computer 102.

At step 408, the primary computer 102 executes its own application software 115. At step 410, the primary computer 102 uses the updated map 134 to access data stored on either the primary data storage 112 or the secondary data storage 130 (shown in FIG. 5). At step 412, a synchronization of the primary computer 102 and the secondary computer 120 occurs in the background. Synchronization involves copying the data blocks indicated by the updated map 134 from the secondary data storage 130 in the secondary computer 120 to the primary data storage 112 in the primary computer 102. The method 400 ends at step 414. Copying the blocks as indicated by the updated map 134 ensures that the primary data storage 112 is updated with the writes that had been issued by application 136 on secondary data storage 130. Additionally, it ensures that data in locations identified in the write log 116 are "rolled back" to the copy in the secondary data storage 130.

Figure 5:
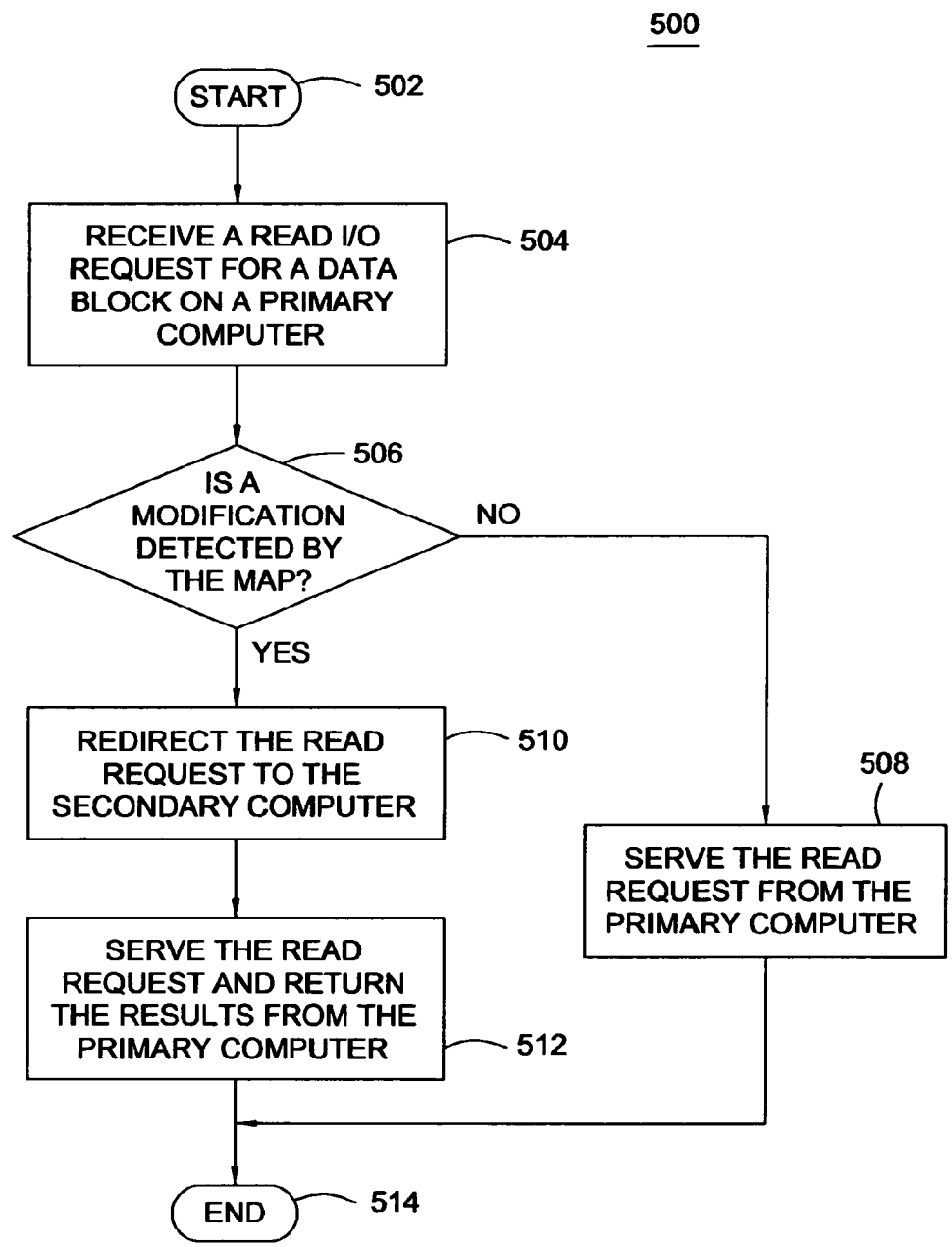
FIG. 5 is a flow diagram of a method for serving a read request, based on an updated map after a failback, in accordance with various embodiments of the invention.

FIG. 5 is a flowchart depicting a method 500 for serving a read request based upon an updated map 134 during a failback, in accordance with one embodiment of the present invention. The method 500 begins at step 502 and proceeds to step 504. At step 502, the primary computer 102 receives a read request to access data. At step 506, the primary computer 102 accesses the map 134 to determine if the data stored on the primary computer 102 is different from the data stored on the secondary computer 120. At step 508, if the map 134 indicates no modifications have been made to the data, then the primary computer 102 services the read request from the primary data storage 112. If the map 134 indicates that modifications were made to the data during the failover period, then the method 500 proceeds to step 510. At step 510, the read request is directed to the secondary computer 120. At step 512, the read request is serviced by the secondary computer 120 from the secondary data storage 130. Further, the secondary server 120 provides the result of the read operation to the primary computer 102. The method 500 ends at step 514.

The present invention provides the benefit of providing for rapid disaster recovery during failback of the primary computer 102. Rapid disaster recovery is achieved by the redirection of read requests from the primary computer 102 to the secondary computer 120, as needed. The synchronization agent 132 and map 134 enable application software 115 within the primary computer 102 to access data that was written to the secondary data storage 130 after failure of the primary computer 102. As such, during failback, the application(s) executed by the primary computer 102 do not have to wait for the storage synchronization before restarting.

Thus, the present invention provides a system, method and computer-readable medium for rapid failback of a secondary computer to a primary computer while providing access to all of the data stored on both the primary and secondary computers. This is an especially desirable feature in a high availability computer system where access to data is often critical.

What is claimed is:

1. A method comprising:
writing updated data to a secondary data storage during a failover time period, wherein
the writing is performed by a secondary computing system,
the secondary computing system is associated with the secondary data storage,
the failover time period begins when a primary computing system fails and ends when the primary computing system becomes functional again, and
a primary data storage is associated with the primary computing system;
writing information associated with the updated data to a mapping file, wherein
the mapping file comprises a write address for the updated data written to the secondary data storage during the failover time period;
transmitting the mapping file from the secondary data storage to the primary computing system;
receiving a read request for the updated data that was written to the secondary data storage during the failover time period; and
servicing the read request using the mapping file, wherein
the servicing comprises using the write address of the updated data, as stored in the mapping file, to access the updated data written to the secondary data storage during the failover time period, and
the transmitting, the receiving and the servicing occur after the primary computing system becomes functional but before synchronization of the primary data storage and the secondary data storage is complete.

2. The method of claim 1, wherein
the mapping file comprises at least one of:
an extent map, or
a data log.

3. The method of claim 1, further comprising:
activating the mapping file at the secondary computing system, after the primary computing system fails.

4. The method of claim 1, wherein the read request is received from the primary computing system.

5. The method of claim 1, further comprising:
receiving contents of a write log from the primary computing system, wherein
the write log identifies modifications not replicated to the secondary computing system before the primary computing system failed; and
synchronizing the write log and the mapping file to determine an updated mapping file.

6. The method of claim 5, wherein the synchronizing further comprises:
performing a union of the write log and the mapping file.

7. The method of claim 1, wherein the servicing the read request further comprises:
identifying the updated data to be accessed for the read request, wherein
the updated data to be accessed for the read request is stored at the secondary data storage; and
transmitting the updated data to be accessed for the read request to the primary computing system.

8. A system comprising:
means for writing updated data to a secondary data storage during a failover time period, wherein
a secondary computing system is associated with the secondary data storage,
the failover time period begins when a primary computing system fails and ends when the primary computing system becomes functional again, and
a primary data storage is associated with the primary computing system;
means for writing information associated with the updated data to a mapping file,
wherein
the mapping file comprises a write address for the updated data written to the secondary data storage during the failover time period;
means for transmitting the mapping file from the secondary data storage to the primary computing system;
means for receiving a read request for the updated data that was written to the secondary data storage during the failover time period; and
means for servicing the read request using the mapping file, wherein
the servicing comprises using the write address of the updated data, as stored in the mapping file, to access the updated data written to the secondary data storage during the failover time period, and
the transmitting, the receiving and the servicing occur after the primary computing system becomes functional but before synchronization of the primary data storage and the secondary data storage is complete.

9. The system of claim 8, wherein
the mapping file comprises at least one of:
an extent map,
a data log.

10. The system of claim 8, further comprising:
means for activating the mapping file at the secondary computing system, after the primary computing system fails.

11. The system of claim 8, wherein the read request is received from the primary computing system.

12. The system of claim 8, further comprising:
means for receiving contents of a write log from the primary computing system, wherein
the write log identifies modifications not replicated to the secondary computing system before the primary computing system failed; and
means for synchronizing the write log and the mapping file to determine an updated mapping file.

13. The system of claim 12, further comprising:
means for performing a union of the write log and the mapping file.

14. The system of claim 8, further comprising:
means for identifying the updated data to be accessed for the read request, wherein
the updated data to be accessed for the read request is stored at the secondary data storage; and
means for transmitting the updated data to be accessed for the read request to the primary computing system.

15. A non-transitory computer-readable storage medium comprising instructions executable to:

write updated data to a secondary data storage during a failover time period,
wherein
a secondary computing system is associated with the secondary data storage,
the failover time period begins when a primary computing system fails and ends when the primary computing system becomes functional again, and
a primary data storage is associated with the primary computing system;
write information associated with the updated data to a mapping file, wherein
the mapping file comprises a write address for the updated data written to the secondary data storage during the failover time period;
transmit the mapping file from the secondary data storage to the primary computing system;
receive a read request for the updated data that was written to the secondary data storage during the failover time period; and
service the read request using the mapping file, wherein
the mapping file is serviced by, at least in part, using the write address of the updated data, as stored in the mapping file, to access the updated data written to the secondary data storage during the failover time period, and
the mapping file is transmitted, the read request is received, and the mapping file is serviced after the primary computing system becomes functional but before synchronization of the primary data storage and the secondary data storage is complete.

16. The non-transitory computer-readable storage medium of claim 15, wherein the instructions are further executable to:
activate the mapping file at the secondary computing system, after the primary computing system fails.

17. The non-transitory computer-readable storage medium of claim 15, wherein the read request is received from the primary computing system.

18. The non-transitory computer-readable storage medium of claim 15, wherein the instructions are further executable to:
receive contents of a write log from the primary computing system, wherein
the write log identifies modifications not replicated to the secondary computing system before the primary computing system failed; and
synchronize the write log and the mapping file to determine an updated mapping file.

19. The non-transitory computer-readable storage medium of claim 18, wherein the instructions are further executable to:
perform a union of the write log and the mapping file.

20. The non-transitory computer-readable storage medium of claim 15, wherein the instructions are further executable to:
identify the updated data to be accessed for the read request, wherein
the updated data to be accessed for the read request is stored at the secondary data storage; and
transmit the updated data to be accessed for the read request to the primary computing system.

* * * * *